US012799873B2

(12) United States Patent
Pesyna et al.

(10) Patent No.: US 12,799,873 B2
(45) Date of Patent: Nov. 17, 2026

(54) VARIABLE STIFFNESS HIGH DAMPING LEAF SEALS FOR GAS TURBINE ENGINES

(71) Applicants: Rolls-Royce North American Technologies Inc., Indianapolis, IN (US); Rolls-Royce Corporation, Indianapolis, IN (US)

(72) Inventors: Kenneth Pesyna, Indianapolis, IN (US); Andrew M. Simonich, Indianapolis, IN (US); Riley Burton, Indianapolis, IN (US); Jordan Thralls, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 19/183,284

(22) Filed: Apr. 18, 2025

(65) Prior Publication Data

US 2026/0328107 A1 Oct. 22, 2026

(51) Int. Cl.
*F01D 11/00* (2006.01)
*F01D 25/04* (2006.01)

(52) U.S. Cl.
CPC ............ *F01D 11/003* (2013.01); *F01D 25/04* (2013.01); *F05D 2240/57* (2013.01); *F05D 2260/96* (2013.01)

(58) Field of Classification Search
CPC ...... F01D 11/00; F01D 11/003; F01D 11/005; F01D 25/04; F05D 2240/57; F05D 2260/96; F16J 15/0887; F16J 15/3288; F16J 15/3292
USPC ........................................................ 277/355
See application file for complete search history.

(56) References Cited

U.S. PATENT DOCUMENTS

| | | | |
|---|---|---|---|
| 4,645,217 A | 2/1987 | Honeycutt, Jr. et al. | |
| 5,524,846 A * | 6/1996 | Shine | F02K 1/805 60/796 |
| 6,267,381 B1 | 7/2001 | Wright | |
| 7,367,567 B2 * | 5/2008 | Farah | F16J 15/0812 277/650 |
| 8,322,976 B2 | 12/2012 | Chila et al. | |
| 8,985,592 B2 | 3/2015 | Green et al. | |
| 10,364,748 B2 | 7/2019 | Teixeira | |
| 10,801,346 B2 | 10/2020 | White et al. | |
| 10,816,198 B2 | 10/2020 | Fujisawa et al. | |
| 10,895,163 B2 | 1/2021 | Schiavo | |
| 10,927,957 B2 | 2/2021 | Smallwood et al. | |
| 11,530,616 B2 | 12/2022 | Roberge | |
| 11,719,108 B2 | 8/2023 | Fujiwara et al. | |
| 11,859,509 B2 | 1/2024 | Renggli | |
| 11,867,066 B2 | 1/2024 | Maalouf | |

(Continued)

*Primary Examiner* — Elton K Wong
(74) *Attorney, Agent, or Firm* — Barnes & Thornburg

(57) ABSTRACT

A leaf seal for use with gas turbine engines includes an inner band and an outer band arranged circumferentially around an axis. The inner band include an inner base configured to couple with a first component of the engine and an inner leaf joint that extends radially and axially away from the inner base. The outer band includes an outer base coupled with the first component and an outer leaf joint that extends radially and axially away from the outer base for engagement with a second component to block fluid from passing between the first component and the second component.

19 Claims, 6 Drawing Sheets

(56) References Cited

U.S. PATENT DOCUMENTS

| | | | | |
|---|---|---|---|---|
| 2004/0150165 | A1* | 8/2004 | Grondahl ............. | F16J 15/3292<br>277/355 |
| 2015/0322807 | A1* | 11/2015 | Budnick ................. | F01D 9/041<br>277/654 |
| 2017/0058700 | A1 | 3/2017 | Heffernan et al. | |
| 2021/0347493 | A1* | 11/2021 | Reller .................... | B64D 29/04 |

* cited by examiner

VARIABLE STIFFNESS HIGH DAMPING LEAF SEALS FOR GAS TURBINE ENGINES

GOVERNMENT LICENSE RIGHTS

This invention was made with government support under contract no. W58RGZ-23-C-0001. The U.S. government may have certain rights in the invention.

BACKGROUND

The present disclosure relates generally to component for turbomachinery, and more specifically to components for turbomachinery such as gas turbine engines.

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high-pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The relatively high temperatures generated, as well as the adapted uses of such gas turbine engines can impose relative movement on its components. Accommodating, relative movements between components can be challenging.

SUMMARY

The present disclosure may comprise one or more of the following features and combinations thereof.

According to an aspect of the present disclosure, a method of assembling a gas turbine engine includes coupling an inner band of a leaf seal to an annular first component of the gas turbine engine, the inner band including an inner base coupled with the annular first component and an inner leaf joint that extends axially and radially away from the inner band at an undeflected first angle relative to an axis, coupling an outer band of the leaf seal to the annular component of the gas turbine engine, the outer band including an outer base coupled with the inner base and an outer leaf joint that extends axially and radially away from the outer base at an undeflected second angle relative to the axis, and moving an annular second component relative to the annular first component to cause the annular second component to engage the outer leaf joint and deflect the outer leaf joint and the inner leaf joint radially inward such that the inner leaf joint extends at a deflected first angle relative to the axis and the outer leaf joint extends at a deflected second angle relative to the axis.

In some embodiments, a terminal end of the inner leaf joint is decoupled from a terminal end of the outer leaf joint so as to allow the outer leaf joint to move independently of the inner leaf joint to so that the leaf seal blocks gases from escaping between the annular first component and the annular second component while damping movement and vibration of the annular second component over a range of axial and radial movements relative to the annular first component.

In some embodiments, the first undeflected angle is between 30 degrees and 60 degrees. The second undeflected angle is between 30 degrees and 60 degrees. The first deflected angle is between 10 degrees and 40 degrees. The second deflected angle is between 10 degrees and 40 degrees.

In some embodiments, the first undeflected angle is different than the second undeflected angle. In some embodiments, the first deflected angle is the same as the second deflected angle.

In some embodiments, the outer band is formed to include a plurality of outer gaps that extend from the terminal end of the outer leaf joint toward the outer base and arranged circumferentially around the axis to define a plurality of outer leaves of the outer band. The inner band is formed to include a plurality of inner gaps that extend from the terminal end of the inner leaf joint toward the inner base and arranged circumferentially around the axis to define a plurality of inner leaves of the inner band.

In some embodiments, the plurality of outer gaps are circumferentially offset from the plurality of inner gaps. In some embodiments, a circumferential dimension of each of the plurality of outer gaps tapers and reduces in size as the plurality of outer gaps extend from the terminal end of the outer leaf joint toward the outer base.

In some embodiments, the outer band is made of a first material and the inner band is made of a second material different than the first material. In some embodiments, the terminal end of the inner leaf joint is spaced apart from the terminal end of the outer leaf joint.

According to an aspect of the present disclosure, a gas turbine engine includes an annular carrier case, an annular exhaust case, and an annular leaf seal. The annular carrier case is arranged around an axis and configured to direct gases axially aft through the annular carrier case. The annular exhaust case is arranged around the axis and configured to receive the gases from the annular carrier case. The annular exhaust case is configured to move axially and radially relative to the annular carrier without contacting the annular carrier case. The annular leaf seal is coupled with one of the annular carrier case and the annular exhaust case and engaged with the other one of the annular exhaust case and the annular carrier case. The annular leaf seal provides a flexible seal that blocks the gases from escaping between the annular carrier case and the annular exhaust case while damping movement and vibration of the annular exhaust case over a range of axial and radial movements of the annular exhaust case relative to the annular carrier case.

In some embodiments, the annular leaf seal includes an inner band and an outer band. The inner band is arranged circumferentially around the axis and the outer band is arranged circumferentially around the inner band. The inner band includes an inner base and an inner leaf joint that extends radially and axially away from the inner base. The outer band includes an outer base and an outer leaf joint that extends radially and axially away from the outer base and engages the annular exhaust case. A terminal end of the inner leaf joint is decoupled from a terminal end of the outer leaf joint so as to allow the outer leaf joint to move independently of the inner leaf joint.

In some embodiments, the terminal end of the inner leaf joint is spaced apart from the terminal end of the outer leaf joint. In some embodiments, the outer band is made of a first material and the inner band is made of a second material different than the first material.

In some embodiments, the outer band is formed to include a plurality of outer gaps that extend from the terminal end of the outer leaf joint toward the outer base and arranged circumferentially around the axis to define a plurality of outer leaves of the outer band. The inner band is formed to include a plurality of inner gaps that extend from the terminal end of the inner leaf joint toward the inner base and arranged circumferentially around the axis to define a plurality of inner leaves of the inner band.

In some embodiments, the plurality of outer gaps are circumferentially offset from the plurality of inner gaps. In some embodiments, a circumferentially dimension of each of the plurality of outer gaps tapers and reduces in size as the plurality of outer gaps extend from the terminal end of the outer leaf joint toward the outer base.

In some embodiments, the annular exhaust case includes a body having a body band that extends axially generally parallel with the axis and a flange that extends axially and radially away from the body. The outer leaf joint engages the body band.

In some embodiments, the outer leaf joint extends at an angle of between 10 and 40 degrees relative to the axis in response to the outer leaf joint engaging the body band. In some embodiments, a majority of a length of the outer leaf joint extends along a linear path between the outer base and the terminal end of the outer leaf joint.

According to an aspect of the present disclosure, a leaf seal includes an inner band and an outer band arranged circumferentially about an axis. The inner band includes an inner base and an inner leaf joint that extends radially and axially away from the inner base. The outer band includes an outer base and an outer leaf joint that extends radially and axially away from the outer base.

In some embodiments, the outer band is formed to include a plurality of outer gaps that extend from a terminal end of the outer leaf joint toward the outer base and arranged circumferentially around the axis to define a plurality of outer leaves of the outer band. The inner band is formed to include a plurality of inner gaps that extend from a terminal end of the inner leaf joint toward the inner base and arranged circumferentially around the axis to define a plurality of inner leaves of the inner band.

In some embodiments, each of the plurality of outer gaps are circumferentially offset from the plurality of inner gaps. In some embodiments, a circumferentially dimension of each of the plurality of outer gaps tapers and reduces in size as the plurality of outer gaps extend from the terminal end of the outer leaf joint toward the outer base.

In some embodiments, the terminal end of the inner leaf joint is decoupled and spaced apart from the terminal end of the outer leaf joint to allow the outer leaf joint to move independently of the inner leaf joint. In some embodiments, the outer band is made of a first material and the inner band is made of a second material different than the first material.

These and other features of the present disclosure will become more apparent from the following description of the illustrative embodiments.

DETAILED DESCRIPTION OF THE DRAWINGS

Figure 1:
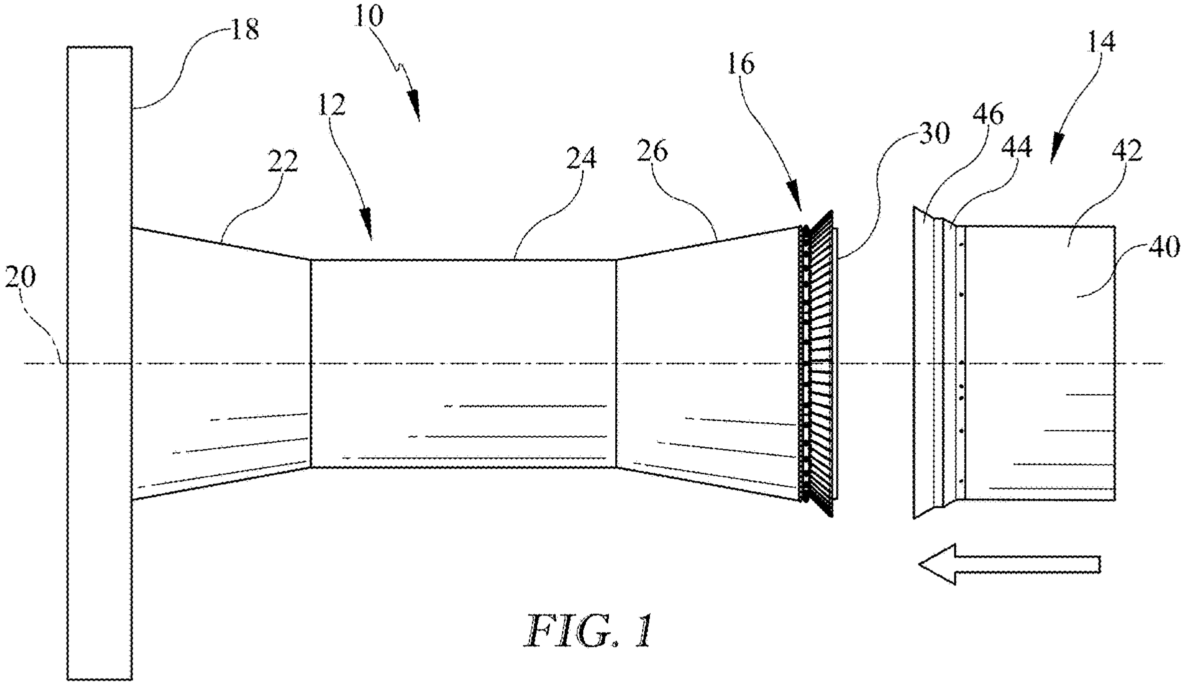
FIG. 1 is an elevation and diagrammatic view of a gas turbine engine system including an engine core, an exhaust unit, and a leaf seal in accordance with the present disclosure coupled with the engine core and suggesting the exhaust unit is moved to engage the leaf seal during assembly and elastically deform a plurality of leaves of the leaf seal so that the leaf seal can accommodate relatively large relative movement and provide high damping between the engine core and the exhaust unit during operation of the gas turbine engine system.

For the purposes of promoting an understanding of the principles of the disclosure, reference will now be made to a number of illustrative embodiments illustrated in the drawings and specific language will be used to describe the same.

Figure 2:
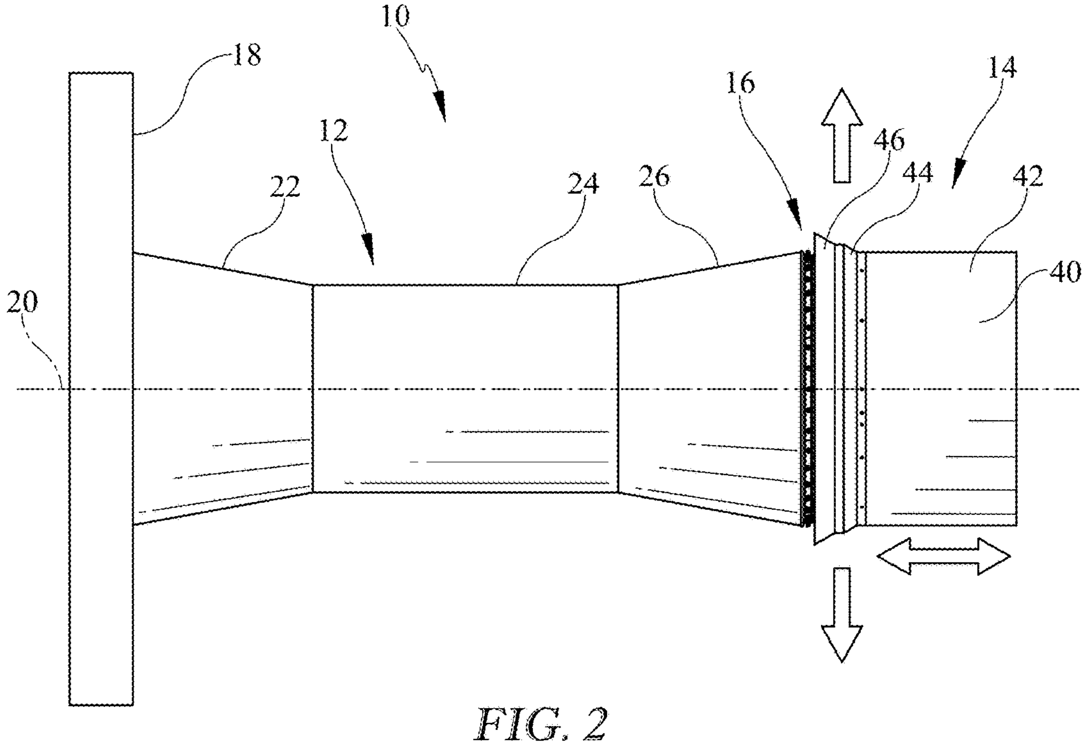
FIG. 2 is an elevation and diagrammatic view similar to FIG. 1 showing the exhaust unit moved to engage the leaf seal such that the leaf seal is arranged to block gases from escaping between the engine core and the exhaust unit while accommodating relatively large relative movement and provide high damping between the engine core and the exhaust unit during operation of the gas turbine engine system.

A gas turbine engine system 10 includes an engine core 12, an exhaust unit 14, and a leaf seal 16 as shown in FIGS. 1 and 2. The illustrative gas turbine engine system 10 further includes a fan 18 driven about an axis 20 by the engine core 12; however, in some embodiments, the fan 18 may be omitted for turbo-jets or a turbo-shaft may be driven by the engine core 12. The engine core 12 combusts air and fuel to provide thrust and/or drive the fan 18 for propelling an aircraft. The exhaust unit 14 is fluidly connected with the engine core 12 for receiving exhaust gases from the engine core 12. The exhaust unit 14 may be configured to reduce heat, reduce noise, combust additional fuel to provide additional thrust, and/or provide any other suitable exhaust treatments downstream of the engine core 12.

During operation of the gas turbine engine system 10, the exhaust unit 14 may move relative to the engine core 12. For example, the exhaust unit 14 may experience different thermal growth as compared to the thermal growth of an aft end of the engine core 12 causing the exhaust unit 14 to move axially and radially about the axis 20 relative to the engine core 12. As another example, the exhaust unit 14 and the engine core 12 may move relative to one another during aircraft maneuvers or as a result of external forces acting on the components. The leaf seal 16 is coupled with the engine core 12 and engaged with the exhaust unit 14 to accommodate the relative movement between the exhaust unit 14 and the engine core 12 and to provide relatively high damping to resist some of the radial movement of the exhaust unit 14. The leaf seal 16 of the present disclosure may improve relative movement and misalignment, material wear, sliding friction, dynamic stiffness and damping, and vibration resistance.

The leaf seal 16 of the present disclosure may provide relatively low radial stiffness and axial stiffness may be relatively low; limited by environment pressure and friction. The leaf seal 16 may be relatively easy to manufacture and lightweight. The size and angles of the leaf seal 16 may be varied and preloaded such that the leaf seal 16 will not pull away from the seal surface for all operating conditions and radial movements. The overlapping leaves provide coulomb damping. The leaf seal 16 may be installed and removed without specialized tooling. The leaf seal 16 is shown as being coupled with the engine core 12; however, it is understood that the leaf seal 16 could be coupled with the exhaust unit 14 and may extend radially inward instead of radially outward in some embodiments.

The engine core 12 includes a compressor section 22, a combustor 24, and a turbine section 26 as shown in FIGS. 1 and 2. The compressor section 22 includes one or more compressor stages and is configured to compress air and deliver the compressed air to the combustor 24. The combustor 24 mixes fuel with the air and combusts the fuel-air mixture to provide hot-high pressure exhaust gases. The turbine section 26 includes one or more turbine stages that are rotated by the exhaust gases to drive the compressor section 22 and the fan 18. The fan 18 pushes air around the engine core 12 to generate thrust for propelling an aircraft. In some embodiments, the fan is omitted, and the exhaust gases provide the majority of the thrust generated by the engine core 12.

Figure 4:
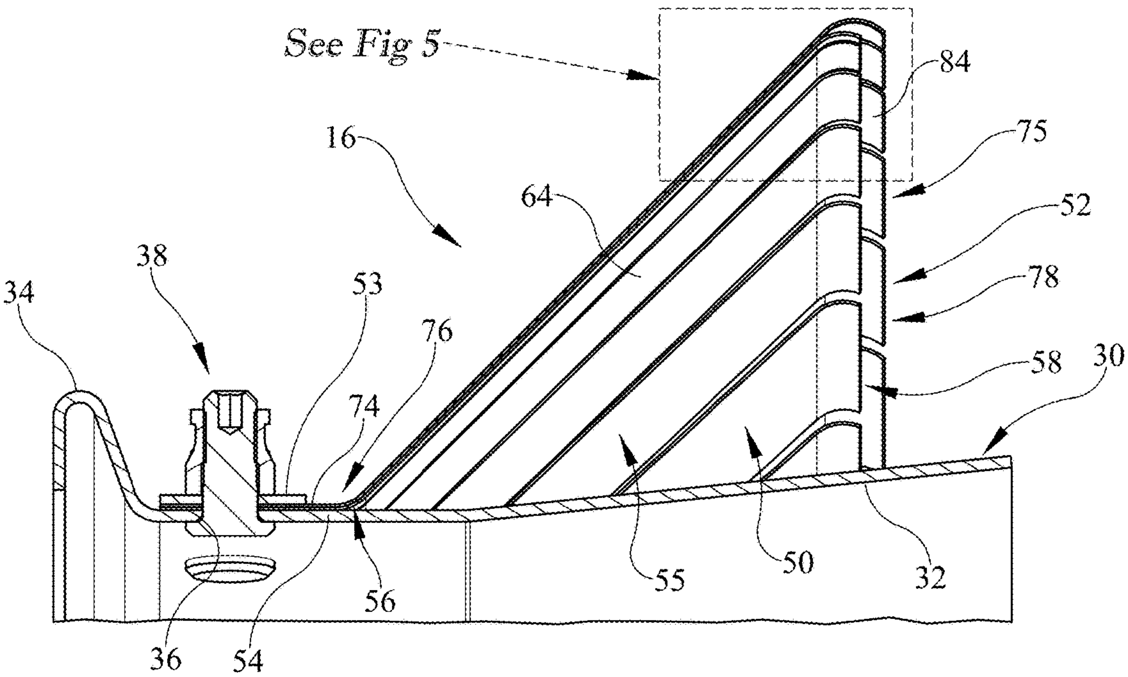
FIG. 4 is a section view of the carrier case and the leaf seal included in the gas turbine engine of FIG. 1, the leaf seal being in an undeflected position and including a base portion and a plurality of leaves that extend radially and axially away from the base portion.

The turbine section 26 includes an annular carrier case 30 arranged circumferentially around the axis 20 and configured to direct the exhaust gases away from the engine core 12. The carrier case 30 may form the turbine case or may be coupled with the turbine case or other structure of the engine core 12. The carrier case 30 includes a body 32 and a lip 34 in the illustrative embodiment as shown in FIG. 4. The body 32 extends generally parallel with the axis 20 and may include an aft portion that extends radially outward as it extends axially aft. The body 32 provides an aero surface that may create a lower amount of flow losses associated with dumping the flow. The lip 34 extends from a forward end of the body 32 and curves radially outward and back radially inward toward the axis 20. The lip 34 provides a surface for a marman clamp or another feature to mount to the engine 12. The body 32 is formed to define a plurality of circumferentially spaced apart holes 36 for receiving fasteners 38 therein to couple the leaf seal 16 with the body 32 of the carrier case 30.

Figure 3:
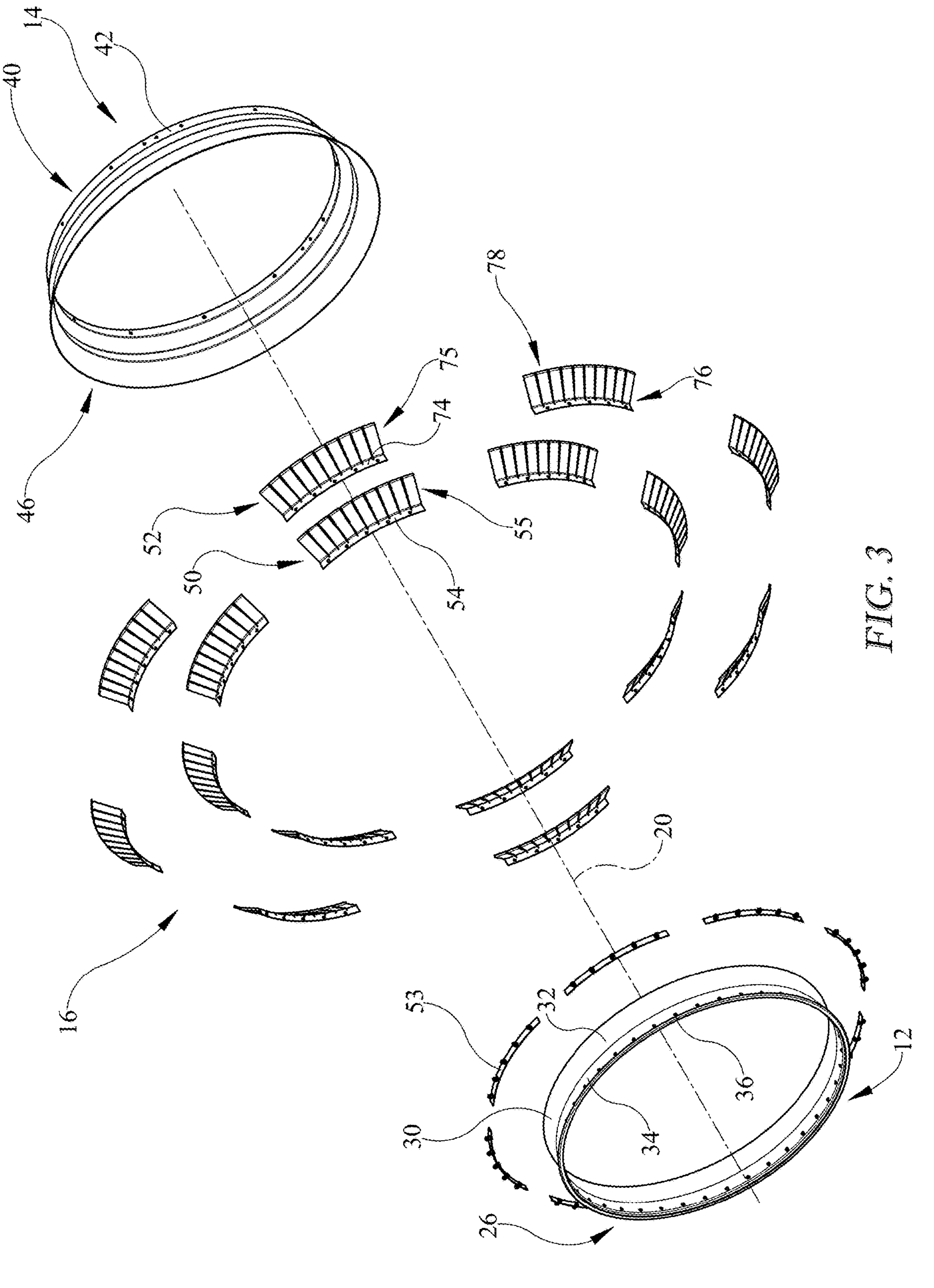
FIG. 3 is an exploded view of an aft end of the gas turbine system of FIG. 1 showing a carrier case of the engine core, an exhaust case of the exhaust unit, and the leaf seal there between and including an outer band formed from a plurality of outer band segments and an inner band formed from a plurality of inner band segments.

The exhaust unit 14 includes an annular exhaust case 40 arranged circumferentially around the axis 20 as shown in FIGS. 2 and 3. The exhaust case 40 is configured to receive the exhaust gases from the turbine section 26 of the engine core 12 and treat the exhaust gases before conducting the exhaust gases out of the exhaust unit 14 to atmosphere for example. The exhaust unit 14 may include other components depending on the features of the specific exhaust unit 14. For example, the exhaust unit 14 may include mixer lobes, vanes, afterburners, detonation combustors, heat exchangers, turbines, diffusers, liquid injectors, etc.

The annular exhaust case 40 includes a mount 42, a body 44, and a flange 46 as shown in FIGS. 1-3, 9 and 10. The mount 42 is configured to couple the exhaust case 40 to another component of the exhaust unit 14 such as another case or housing member. The body 44 extends axially forward from the mount band 42 and includes a body band 47 that extends generally parallel with the axis 20. The body 44 may include additional segments such as a radially and axially extending segment 48 that extends between the body band 47 and the mount 42. The body band 47 is arranged to provide a land or surface for engaging with the leaf seal 16 during operation of the gas turbine engine system 10. The body band 47 is a generally continuous cylinder segment without interruption in the illustrative embodiment. The flange 46 extends axially forward from the body 44 and radially outward.

The flange 46 has a radial height that is greater than a radial height of a terminal end of the leaf seal 16 when the leaf seal is undeformed as shown in FIG. 1. The flange 46 is arranged to extend axially over the carrier case 30 while being spaced apart from and out of contact with the carrier case 30 when the gas turbine engine system 10 is being operated. As a result, the exhaust case 40 is at least partway aligned axially with the carrier case 30 such that the forward end of the exhaust case 40 overlaps the aft end of the carrier case 30.

Figure 9:
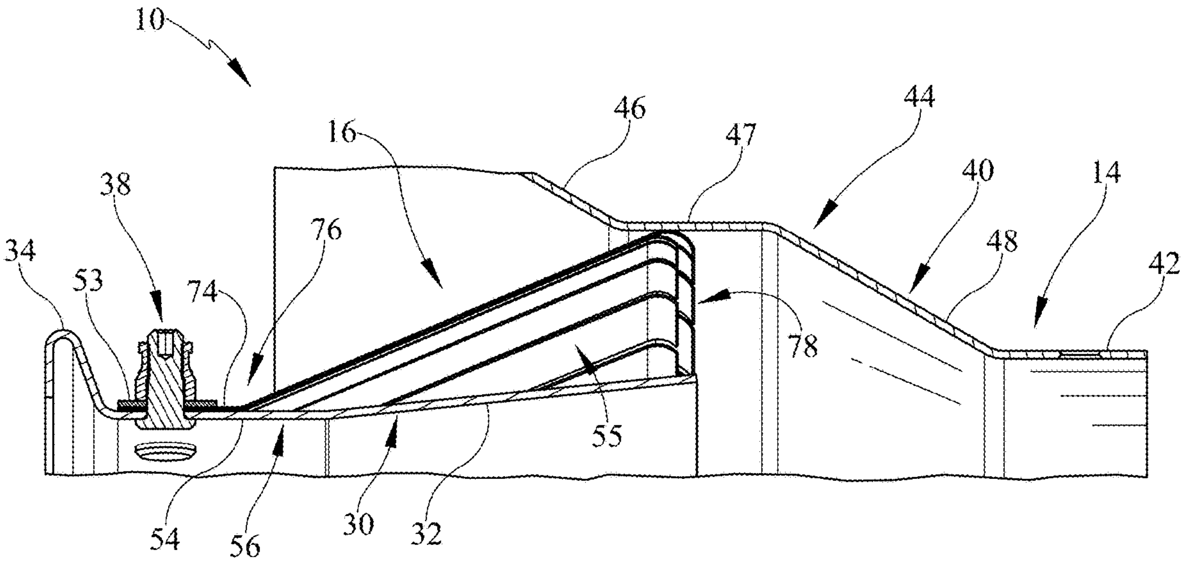
FIG. 9 is a section view of the aft end of the gas turbine engine system of FIG. 2 with the exhaust component assembled with the engine core and engaged with the leaf seal to cause the leaf seal to be in a deflected position so that the plurality of leaves are biased against the exhaust component to accommodate and dampen movement of the exhaust unit relative to the engine core.
Figure 10:
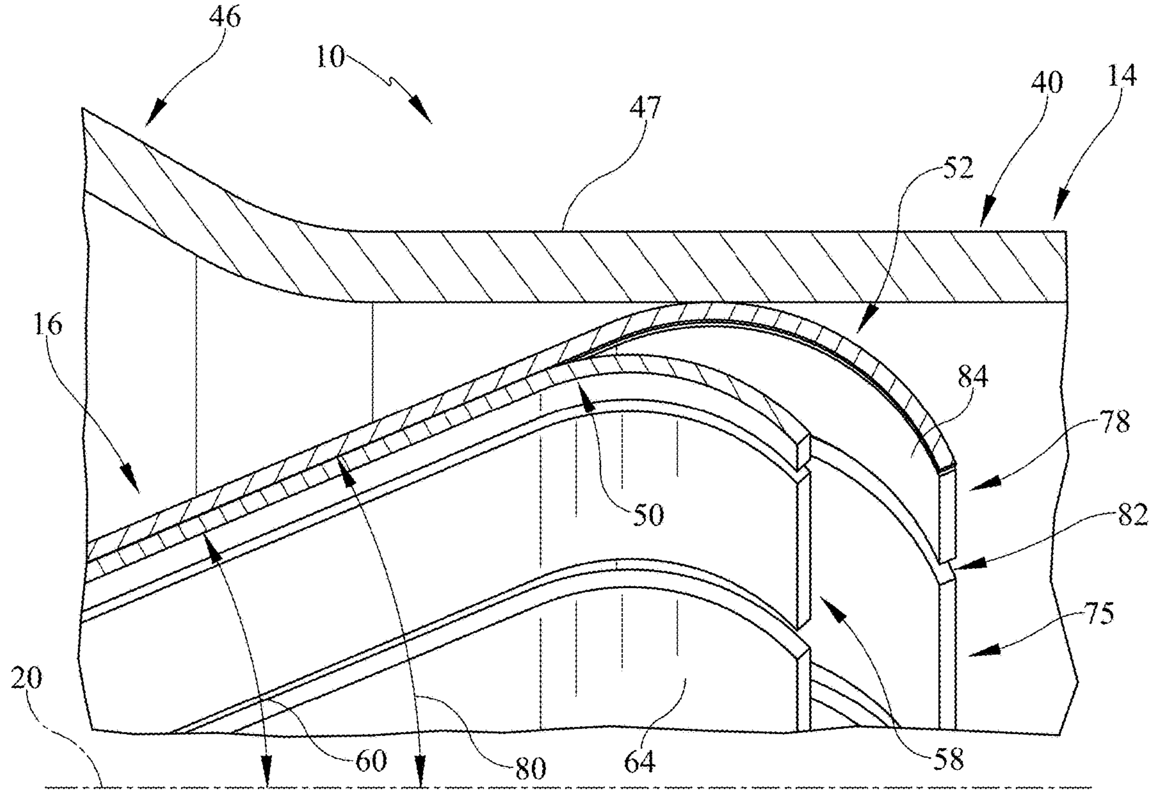
FIG. 10 is an enlarged section view of the exhaust unit and leaf seal of FIG. 9, the outer band of the leaf seal being arranged around the inner band of the leaf seal and engaged with the exhaust unit, the outer band and the inner band are decoupled at the terminal end of the leaf seal to allow for relative movement between the outer band and the inner band.

The leaf seal 16 forms an annular component that is coupled with the carrier case 30 and engaged with the exhaust case 40 as shown in FIGS. 9 and 10. The leaf seal 16 provides a flexible seal that blocks the exhaust gases from escaping between the carrier case 30 and the exhaust case 40 while damping movement and vibration of the exhaust case 40 over a range of axial and radial movements of the exhaust case 40 relative to the carrier case 30. The leaf seal 16 includes an inner band 50 arranged circumferentially around the axis 20 and an outer band 52 arranged circumferentially around the inner band 50. In the illustrative embodiment, the inner band 50 is formed by a plurality of circumferentially extending segments and the outer band 52 is formed by a plurality of circumferentially extending segments. In some embodiments, the inner band 50 and/or the outer band 52 are each formed as a single, integral ring. The leaf seal 16 further includes a retainer ring 53 arranged along the outer base 74 of the outer band 52.

Figure 5:
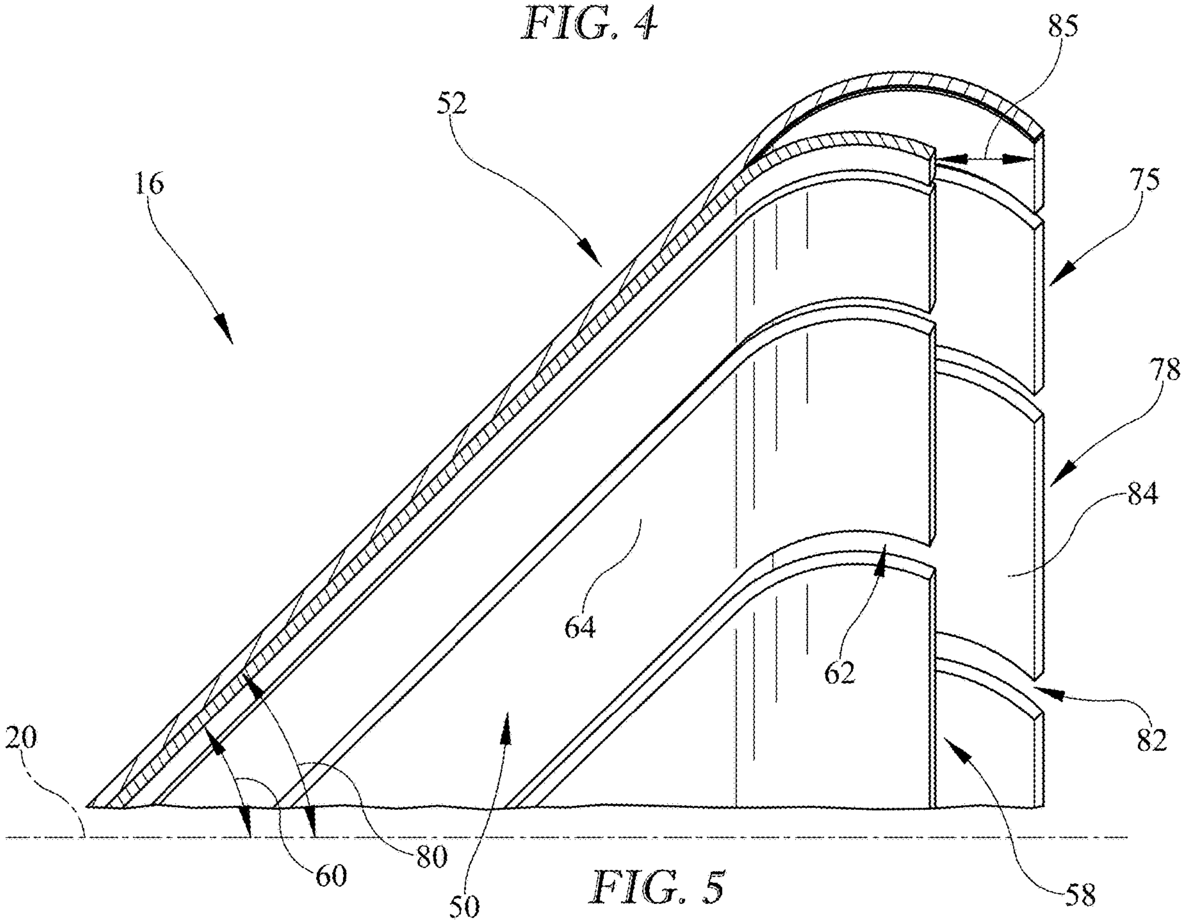
FIG. 5 is an enlarged section view of the leaf seal of FIG. 4, the outer band of the leaf seal being arranged around the inner band of the leaf seal and showing the outer band and the inner band are decoupled at the terminal end of the leaf seal to allow for relative movement between the outer band and the inner band.

The inner band 50 include an inner base 54 coupled with the body 32 of the carrier case 30 and an inner leaf joint 55 that extends radially and axially away from the inner base 54 as shown in FIGS. 4 and 5. The inner base 54 extends generally parallel to the axis 20 and continuously along a contour of an outer surface of the body 32 of the carrier case 30. The inner base 54 is formed with holes for receiving the fasteners 38 to couple the inner base 54 with the carrier case 30. The inner leaf joint 55 has an end 56 coupled with the inner base 54 and a terminal end 58 spaced apart from and cantilevered from the end 56. The inner leaf joint 55 is curved radially outward and away from the inner base 54 at the end 56 of the inner leaf joint 55. A majority of a length of the inner leaf joint 55 extends along a linear path between the inner base 54 and the terminal end 58 of the inner leaf joint 55.

The inner leaf joint 55 extends away from the inner base 54 at an angle 60 relative to the axis 20 when the leaf seal 16 is undeflected as shown in FIGS. 4 and 5. The angle 60 is between 10 and 80 degrees relative to the axis 20 when the leaf seal 16 is undeflected in some embodiments. The angle 60 is between 20 degrees and 70 degrees relative to the axis 20 when the leaf seal 16 is undeflected in some embodiments. The angle 60 is between 30 degrees and 60 degrees relative to the axis 20 when the leaf seal 16 is undeflected in some embodiments. The angle 60 is between 40 degrees and 50 degrees relative to the axis 20 when the leaf seal 16 is undeflected in some embodiments. The angle 60 is about 45 degrees relative to the axis 20 when the leaf seal 16 is undeflected in the illustrative embodiment.

As described below, the inner leaf joint 55 is elastically deformed when the exhaust case 40 is installed and engaged with the leaf seal 16. The angle 60 is between 0 and 50 degrees relative to the axis 20 when the leaf seal 16 is deflected by the exhaust case 40 in some embodiments. The angle 60 is between 10 and 40 degrees relative to the axis 20 when the leaf seal 16 is deflected in some embodiments. The angle 60 is between 20 and 30 degrees relative to the axis 20 when the leaf seal 16 is deflected in some embodiments. The angle 60 is between 22 and 28 degrees relative to the axis 20 when the leaf seal 16 is deflected in some embodiments. The angle 60 is about 25 degrees relative to the axis 20 when the leaf seal 16 is deflected in the illustrative embodiment.

The inner leaf joint 55 is formed to include a plurality of inner gaps 62 that extend from the terminal end of the inner leaf joint 55 toward the inner base 54 and arranged circumferentially around the axis 20 to define a plurality of inner leaves 64 of the inner band 50. Illustratively, a circumferentially dimension 66 of each of the plurality of inner gaps 62 tapers and reduces in size as the plurality of inner gaps 62 extend from the terminal end 58 of the inner leaf joint 55 toward the inner base 54 as suggested in FIG. 6. In the illustrative embodiment, each of the inner gaps 62 extend from the terminal end 58 of the inner leaf joint 55 and partway into the inner base 54. Each inner leaf 64 extends generally along a straight path from the inner base 54 to a tip of the inner leaf 64 where it curves radially inward toward the axis 20.

The outer band 52 include an outer base 74 arranged around the inner base 54 and coupled with the body 32 of the carrier case 30 and an outer leaf joint 75 that extends radially and axially away from the outer base 74 as shown in FIGS. 4 and 5. The outer base 74 extends circumferentially about the axis 20 and axially generally parallel to the axis 20. The outer base 74 is formed with holes for receiving the fasteners 38 to couple the outer base 74 with the inner base 54 and the carrier case 30. The outer leaf joint 75 has an end 76 coupled with the outer base 74 and a terminal end 78 spaced apart from and cantilevered from the end 76. The outer leaf joint 75 is curved radially outward and away from the outer base 74 at the end 76 of the outer leaf joint 75. A majority of a length of the outer leaf joint 75 extends along a linear path between the outer base 74 and the terminal end 78 of the outer leaf joint 75.

The outer leaf joint 75 extends away from the outer base 74 at an angle relative to the axis 20 when the leaf seal 16 is undeflected as shown in FIGS. 4 and 5. The angle 80 is between 10 degrees and 80 degrees relative to the axis 20 when the leaf seal 16 is undeflected in some embodiments. The angle 80 is between 20 degrees and 70 degrees relative to the axis 20 when the leaf seal 16 is undeflected in some embodiments. The angle 80 is between 30 degrees and 60 degrees relative to the axis 20 when the leaf seal 16 is undeflected in some embodiments. The angle 80 is between 40 degrees and 50 degrees relative to the axis 20 when the leaf seal 16 is undeflected in some embodiments. The angle 80 is about 45 degrees relative to the axis 20 when the leaf seal 16 is undeflected in the illustrative embodiment.

Figure 7:
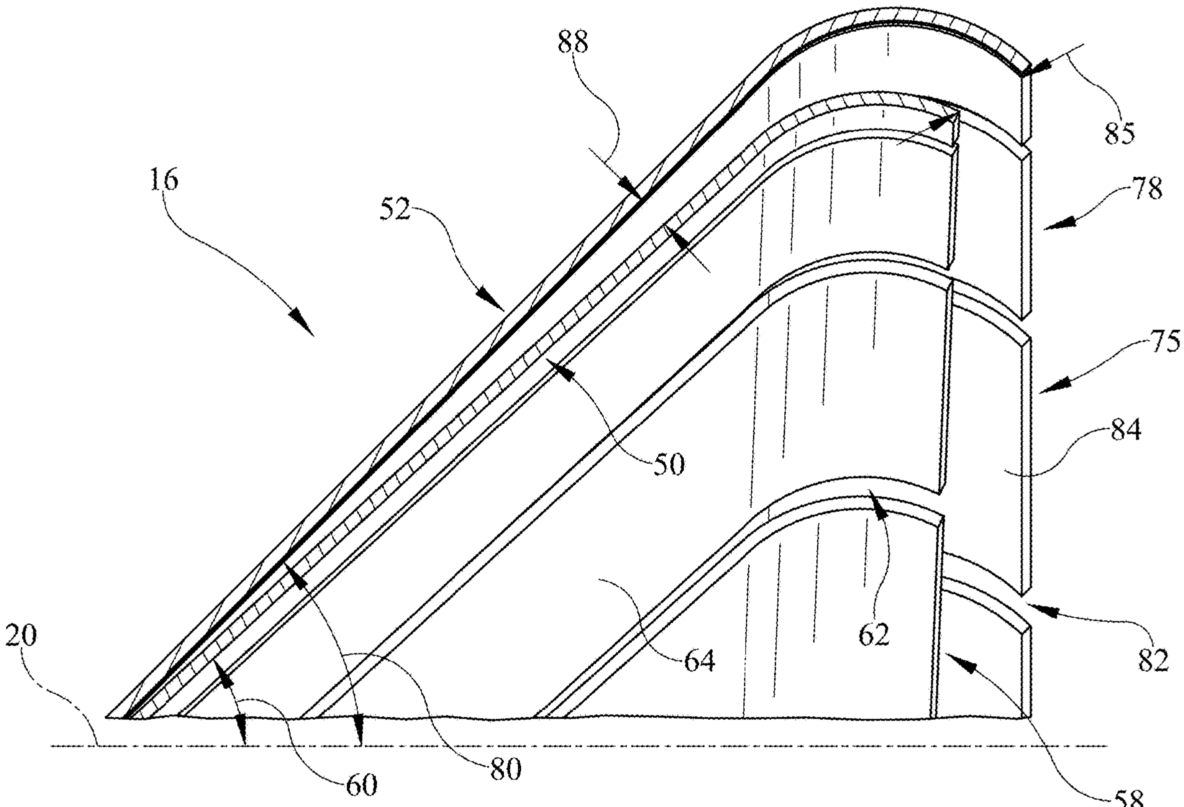
FIG. 7 is an enlarged section view of a leaf seal adapted for use in the gas turbine engine system of FIG. 1, the leaf seal including an outer band having a plurality of outer leaves and an inner band having a plurality of inner leaves that are spaced apart from the outer leaves by an angle alpha when the leaf seal is decoupled from the exhaust component and undeformed, the angle alpha being selected to provide the desired sealing between the components.

The angle 80 may be about equal to the angle 60 as shown in FIGS. 4 and 5. In some embodiments, the angle 80 and the angle 60 are different as shown in FIG. 7. For example, an angle 88 between the outer leaf joint 75 and the inner leaf joint 55 may be between about 0 degrees and 50 degrees when the leaf seal 16 is undeflected. The angle 88 may provide varying stiffness and damping for the exhaust case 40. For example, during installation, the exhaust case 40 may engage and elastically deform the outer leaf joint 75 by a first distance until the outer leaf joint 75 engages the inner leaf joint 55. For such arrangements, the outer finer joint 75, but not the inner leaf joint 55 may apply a resistive and damping force to the exhaust case 40. As the outer leaf joint 75 is further deflected, the outer leaf joint 75 engages the inner leaf joint 55 and the both the outer leaf joint 75 and the inner leaf joint 55 apply a resistive and damping force to the exhaust case 40.

The stiffness of the inner leaf joint 55 may be different than the outer leaf joint 75 and the angles 60, 80, 88 may be varied such that tuning of the forces of the outer leaf joint 75 and inner leaf joint 55 against the exhaust case 40 may be tuned for different sizes, operating conditions, installation arrangements, etc. In the completely installed position and during operation, the angle 88 may exist between the outer leaf joint 75 and the inner leaf joint 55 or the angle 88 may be eliminated by the deflection of the joints 75, 55.

The angle 88 between the outer leaf joint 75 and the inner leaf joint 55 may be between about 0 degrees and 40 degrees when the leaf seal 16 is undeflected or deflected. The angle 88 between the outer leaf joint 75 and the inner leaf joint 55 may be between about 0 degrees and 30 degrees when the leaf seal 16 is undeflected or deflected. The angle 88 between the outer leaf joint 75 and the inner leaf joint 55 may be between about 0 degrees and 20 degrees when the leaf seal 16 is undeflected or deflected. The angle 88 between the outer leaf joint 75 and the inner leaf joint 55 may be between about 10 degrees and 40 degrees when the leaf seal 16 is undeflected or deflected. The angle 88 between the outer leaf joint 75 and the inner leaf joint 55 may be between about 10 degrees and 30 degrees when the leaf seal 16 is undeflected or deflected. The angle 88 between the outer leaf joint 75 and the inner leaf joint 55 may be between about 10 degrees and 20 degrees when the leaf seal 16 is undeflected or deflected. The angle 88 between the outer leaf joint 75 and the inner leaf joint 55 may be between about 20 degrees and 50 degrees when the leaf seal 16 is undeflected or deflected. The angle 88 between the outer leaf joint 75 and the inner leaf joint 55 may be between about 20 degrees and 40 degrees when the leaf seal 16 is undeflected or deflected.

As described below, the outer leaf joint 75 is elastically deformed when the exhaust case 40 is installed and engaged with the leaf seal 16. The angle 80 is between 0 and 50 degrees relative to the axis 20 when the leaf seal 16 is deflected by the exhaust case 40 in some embodiments. The angle 80 is between 10 and 40 degrees relative to the axis 20 when the leaf seal 16 is deflected in some embodiments. The angle 80 is between 20 and 30 degrees relative to the axis 20 when the leaf seal 16 is deflected in some embodiments. The angle 80 is between 22 and 28 degrees relative to the axis 20 when the leaf seal 16 is deflected in some embodiments. The angle 80 is about 25 degrees relative to the axis 20 when the leaf seal 16 is deflected in the illustrative embodiment.

The outer leaf joint 75 is formed to include a plurality of outer gaps 82 that extend from the terminal end 78 of the outer leaf joint 75 toward the outer base 74 and arranged circumferentially around the axis 20 to define a plurality of outer leaves 84 of the inner band 50. Illustratively, a circumferentially dimension 86 of each of the plurality of outer gaps 82 tapers and reduces in size as the plurality of outer gaps 82 extend from the terminal end 86 of the inner leaf joint 75 toward the outer base 74 as suggested in FIG. 6. In the illustrative embodiment, each of the outer gaps 82 extend from the terminal end 86 of the outer leaf joint 75 and partway into the outer base 74. Each outer leaf 84 extends generally along a straight path from the outer base 74 to a tip of the outer leaf 84 where it curves radially inward toward the axis 20.

Figure 6:
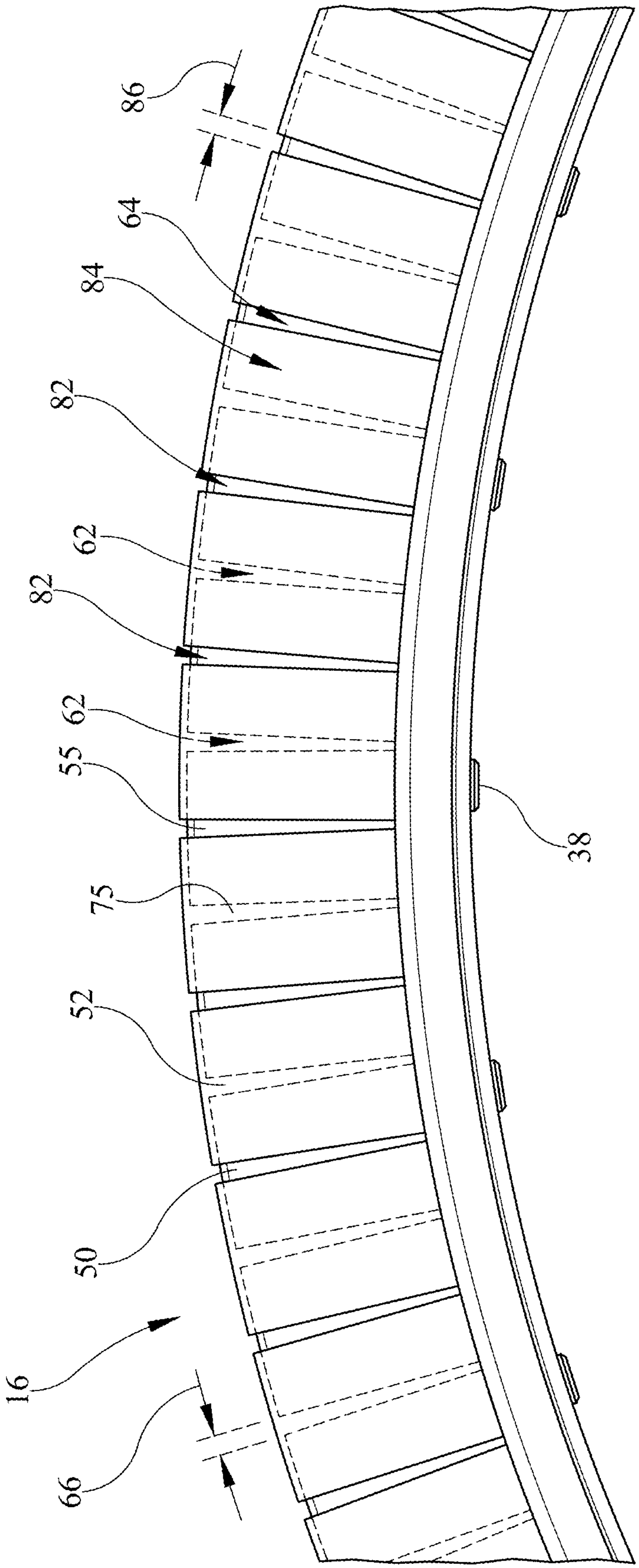
FIG. 6 is an elevation view of the carrier case and leaf seal of FIG. 4 showing gaps formed between each outer leaf and suggesting that the inner band is formed to define gaps between each inner leaf and the gaps in the inner band are offset circumferentially from the gaps in the outer band to block gases from flowing between the outer band and the inner band while allowing for a desired level of movement of the leaves of the leaf seal.

The plurality of outer gaps 82 are circumferentially offset from the plurality of inner gaps 62 as shown in FIG. 6. As a result, no outer gap 82 is aligned circumferentially with any inner gap 62 or vice versa. The misaligned gaps 62, 82 block gases from passing through the leaf seal 16 and escaping the gas turbine engine system 10 while allowing for radial deflection of the outer leaf joint 75 and the inner leaf joint 55.

Figure 8:
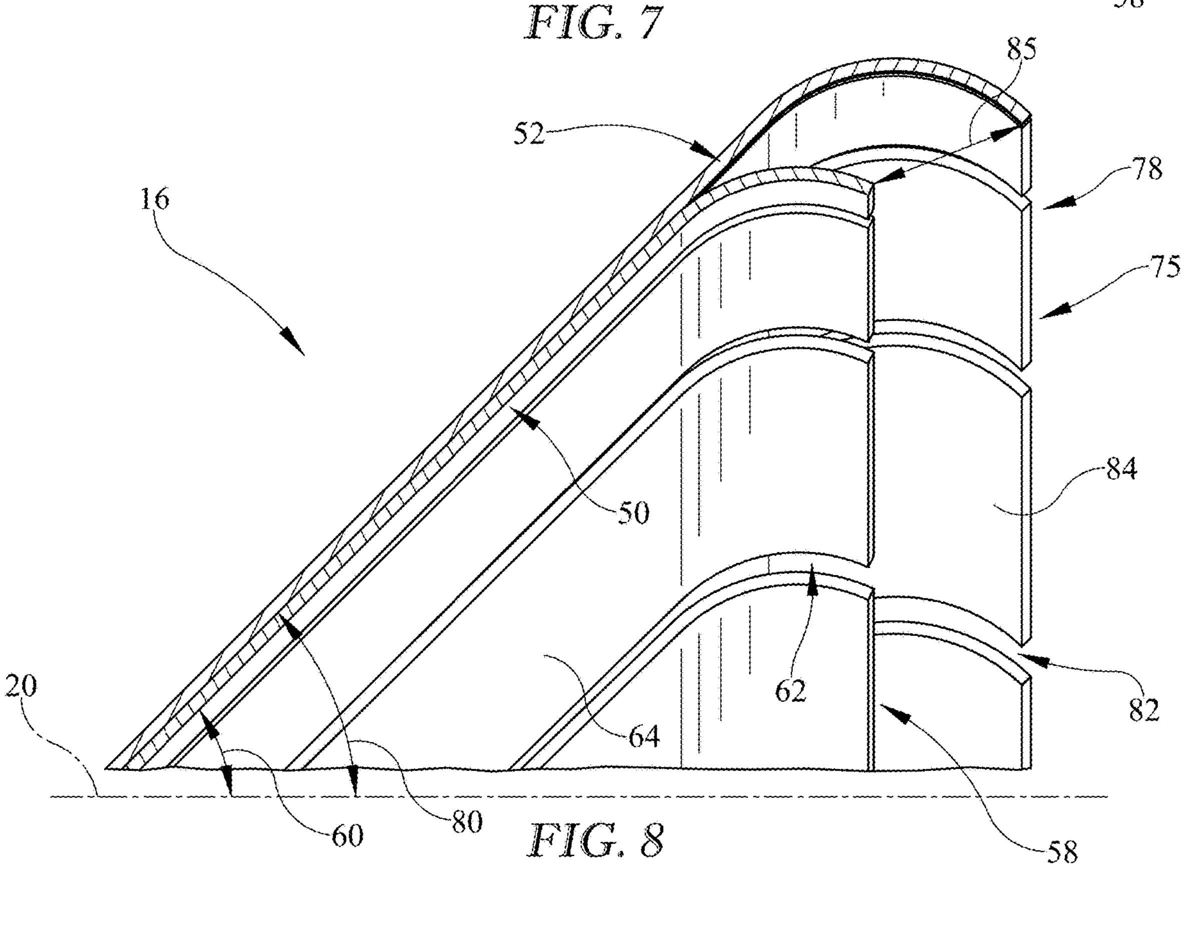
FIG. 8 is an enlarged section view of a leaf seal adapted for use in the gas turbine engine system of FIG. 1, the leaf seal including an outer band having a plurality of outer leaves and an inner band having a plurality of inner leaves that are spaced apart axially from the outer leaves by a predetermined distance when the leaf seal is decoupled from the exhaust component and undeformed, the distance being selected based on desired movement and damping amounts of the components.

As shown in FIGS. 5 and 10, the terminal end 58 of the inner leaf joint 55 is decoupled from the outer leaf joint 75. As a result, the inner leaf joint 55 and the outer leaf joint 75 are movable relative to one another during installation and during operation. For example, during operation, the exhaust case 40 moves radially relative to the axis 20 and the outer and inner leaf joints 75, 55 deflect and undeflect radially with the exhaust case 40. The joints 75, 55 being decoupled allow for large ranges of deflections of the leaf seal 16 without damage or excess wear to the leaf joints 75, 55. The inner leaf joint 55 is engaged with the outer leaf joint 75 except at the curved tip of the leaf joint 55 in the illustrative embodiment. As shown in FIG. 5, the terminal end 58 of the inner leaf joint 55 is spaced apart from the terminal end 78 of the outer leaf joint 75 by a distance 85. The distance 85 is variable as suggested in FIG. 8 to vary the resistance and damping forces of the inner leaf joint 55.

The inner band 50 may have different material properties than the outer band 52 such as, for example, stiffness, yield strength, etc. The inner band 50 may be made of a different material than the outer band 52. The inner band 50 may be made of a same material as the outer band 52, but with different forming processes or dimensions to provide different material properties or reaction forces against the exhaust case 40. In some embodiments, the number of inner leaves 64 is equal to the number of outer leaves 84. In some embodiments, the number of inner leaves 64 is less than or greater than the number of outer leaves 84 to adjust a desired stiffness.

During assembly, the inner base 54 of the inner band 50 is arranged around the body 44 of the carrier case 30. The outer base 74 of the outer band 52 is arranged around the inner base 54. The retainer ring 53 is arranged around the outer base 74. The fasteners 38 are inserted through the holes in the retainer ring 53, the outer base 74, and the inner base 54 and coupled with the carrier case 30.

The inner leaf joint 55 extends at the angle 60 and the outer leaf joint 75 extends at the angle 80 in the undeflected positions as shown in FIGS. 1 and 5. The exhaust case 40 is aligned with the leaf seal 16 along the axis 20 and moved towards the leaf seal 16. The flange 46 of the exhaust case 40 engages the terminal end 78 of the outer leaf joint 75 and urges the outer leaf joint 75 radially inward toward the axis as the flange 46 is moved further axially toward the carrier case 30. The force of the flange 46 deflects the outer leaf joint 75 which deflects the inner leaf joint 55 causing the angles 60, 80 to reduce in magnitude. The outer leaf joint 75 engages the body 44 of the exhaust case 40 which provides a land for the leaf seal 16.

During use of the gas turbine engine 10, the leaf seal 16 is coupled with the engine core 12 for any movement therewith. The exhaust case 40 may move radially, axially, and possibly circumferentially relative to the axis 20 and also relative to the leaf seal 16. The leaf seal 16 maintains engagement with the body 44. In particular, the outer leaves 84 and the inner leaves 64 deflect radially inward and radially outward to maintain contact with the body 44 of the exhaust case 40 and block the gases from escaping between the carrier case 30 and the exhaust case 40 while damping movement and vibration of the exhaust case 40 over a range of axial and radial movements of the exhaust case 40 relative to the carrier case 30 as suggested in FIG. 2.

Sealing of fluids, particularly air, is performed in turbine engine hardware to maintain efficiency, provide pressure, and cool hot parts. In areas where two parts are joined, the seal may be designed to function under increased demands such as relative movement and misalignment, material wear, sliding friction, and dynamic stiffness and damping. An example of an elevated temperature joint is the joint between the aft end of a turbine engine and an attached exhaust system. In conventional engines, a bellow, or expansion joint, may be used to seal the joint and connect the interfacing hardware. However, such seals may provide an undesirable high stiffness and relatively less damping and may also wear or fail under typical loading.

The present disclosure provides a seal that may withstand dynamic vibrations that propagate from the exhaust system and isolate the vibrations from the engine core. The leaf seal 16 of the present disclosure is configured to seal the joint while providing lower stiffness. The leaf seal 16 may alter the modal response of the exhaust system 14 to better suite the entire system (aircraft, engine, exhaust system). The leaf seal 16 may be made of a circular array of bent metal tabs, which when deflected act as a spring. The tabs are overlapped in two or more layers to block air flow through the gaps. The deflection of the leaves then allows for radial movement to occur between the engine and exhaust system while maintaining a relatively low force reaction.

In illustrative embodiments, the leaf seal 16 includes the gaps 62, 82 that are non-parallel. In conventional seals, if deflections are small enough, then parallel gaps may be used without clashing. However, when deflections of the seal become relatively large (due to large radial relative movements between the cases 30, 40 of the present disclosure) the gaps may be angled to allow for more deflection of each individual leaf. Additionally, angling the gaps removes more material, thus decreasing the overall weight.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of assembling a gas turbine engine, the method comprising coupling an inner band of a leaf seal to an annular first component of the gas turbine engine, the inner band including an inner base coupled with the annular first component and an inner leaf joint that extends axially and radially away from the inner band at an undeflected first angle relative to an axis, coupling an outer band of the leaf seal to the annular component of the gas turbine engine, the outer band including an outer base coupled with the inner base and an outer leaf joint that extends axially and radially away from the outer base at an undeflected second angle relative to the axis, and moving an annular second component relative to the annular first component to cause the annular second component to engage the outer leaf joint and deflect the outer leaf joint and the inner leaf joint radially inward such that the inner leaf joint extends at a deflected first angle relative to the axis and the outer leaf joint extends at a deflected second angle relative to the axis, wherein a terminal end of the inner leaf joint is decoupled from a terminal end of the outer leaf joint so as to allow the outer leaf joint to move independently of the inner leaf joint so that the leaf seal blocks gases from escaping between the annular first component and the annular second component while damping movement and vibration of the annular second component over a range of axial and radial movements relative to the annular first component, wherein the first undeflected angle is different than the second undeflected angle.

2. The method of claim 1, wherein the first undeflected angle is between 30 degrees and 60 degrees, the second undeflected angle is between 30 degrees and 60 degrees, the first deflected angle is between 10 degrees and 40 degrees, and the second deflected angle is between 10 degrees and 40 degrees.

3. The method of claim 1, wherein the first deflected angle is the same as the second deflected angle.

4. The method of claim 1, wherein the terminal end of the inner leaf joint is spaced apart from the terminal end of the outer leaf joint.

5. The method of claim 1, wherein the outer band is formed to include a plurality of outer gaps that extend from the terminal end of the outer leaf joint toward the outer base and arranged circumferentially around the axis to define a plurality of outer leaves of the outer band, the inner band is formed to include a plurality of inner gaps that extend from the terminal end of the inner leaf joint toward the inner base and arranged circumferentially around the axis to define a plurality of inner leaves of the inner band, and the plurality of outer gaps are circumferentially offset from the plurality of inner gaps.

6. The method of claim 5, wherein a circumferential dimension of each of the plurality of outer gaps tapers and reduces in size as the plurality of outer gaps extend from the terminal end of the outer leaf joint toward the outer base.

7. The method of claim 1, wherein the outer band is made of a first material and the inner band is made of a second material different than the first material.

8. A gas turbine engine comprising:

an annular carrier case arranged around an axis and configured to direct gases axially aft through the annular carrier case, an annular exhaust case arranged around the axis and configured to receive the gases from the annular carrier case, and the annular exhaust case being configured to move axially and radially relative to the annular carrier case without contacting the annular carrier case; and an annular leaf seal coupled with one of the annular carrier case and the annular exhaust case and engaged with the other one of the annular exhaust case and the annular carrier case to provide a flexible seal that blocks the gases from escaping between the annular carrier case and the annular exhaust case while damping movement and vibration of the annular exhaust case over a range of axial and radial movements of the annular exhaust case relative to the annular carrier case, wherein the annular leaf seal includes an inner band arranged circumferentially around the axis and an outer band arranged circumferentially around the inner band, the inner band includes an inner base and an inner leaf joint that extends radially and axially away from the inner base at a first angle, the outer band includes an outer base and an outer leaf joint that extends radially and axially away from the outer base at a second angle and engages the annular exhaust case, and a terminal end of the inner leaf joint is decoupled from a terminal end of the outer leaf joint so as to allow the outer leaf joint to move independently of the inner leaf joint, wherein the first angle is different than the second angle.

9. The gas turbine engine of claim 8, wherein the terminal end of the inner leaf joint is spaced apart from the terminal end of the outer leaf joint.

10. The gas turbine engine of claim 8, wherein the outer band is formed to include a plurality of outer gaps that extend from the terminal end of the outer leaf joint toward the outer base and arranged circumferentially around the axis to define a plurality of outer leaves of the outer band, the inner band is formed to include a plurality of inner gaps that extend from the terminal end of the inner leaf joint toward the inner base and arranged circumferentially around the axis to define a plurality of inner leaves of the inner band, and the plurality of outer gaps are circumferentially offset from the plurality of inner gaps.

11. The gas turbine engine of claim 10, wherein a circumferential dimension of each of the plurality of outer gaps tapers and reduces in size as the plurality of outer gaps extend from the terminal end of the outer leaf joint toward the outer base.

12. The gas turbine engine of claim 8, wherein the outer band is made of a first material and the inner band is made of a second material different than the first material.

13. The gas turbine engine of claim 8, wherein the annular exhaust case includes a body having a body band that extends axially generally parallel with the axis and a flange that extends axially and radially away from the body and the outer leaf joint engages the body band.

14. The gas turbine engine of claim 13, wherein the outer leaf joint extends at an angle of between 10 and 40 degrees relative to the axis in response to the outer leaf joint engaging the body band.

15. The gas turbine engine of claim 14, wherein a majority of a length of the outer leaf joint extends along a linear path between the outer base and the terminal end of the outer leaf joint.

16. A leaf seal comprising an inner band arranged circumferentially around an axis, the inner band includes an inner base and an inner leaf joint that extends radially and axially away from the inner base at a first angle relative to the axis; and an outer band arranged circumferentially around the inner band, the outer band includes an outer base and an outer leaf joint that extends radially and axially away from the outer base at a second angle relative to the axis, wherein the outer band is formed to include a plurality of outer gaps that extend from a terminal end of the outer leaf joint toward the outer base and arranged circumferentially around the axis to define a plurality of outer leaves of the outer band, the inner band is formed to include a plurality of inner gaps that extend from a terminal end of the inner leaf joint toward the inner base and arranged circumferentially around the axis to define a plurality of inner leaves of the inner band, and the plurality of outer gaps are circumferentially offset from the plurality of inner gaps, wherein the first angle is different than the second angle.

17. The leaf seal of claim 16, wherein the terminal end of the inner leaf joint is decoupled and spaced apart from the terminal end of the outer leaf joint so as to allow the outer leaf joint to move independently of the inner leaf joint.

18. The leaf seal of claim 16, wherein a circumferential dimension of each of the plurality of outer gaps tapers and reduces in size as the plurality of outer gaps extend from the terminal end of the outer leaf joint toward the outer base.

19. The leaf seal of claim 16, wherein the outer band is made of a first material and the inner band is made of a second material different than the first material.

* * * * *